A. GRECO.
DEVICE AND METHOD OF CANNING BEANS.
APPLICATION FILED MAY 1, 1917.
1,235,680.
Patented Aug. 7, 1917.
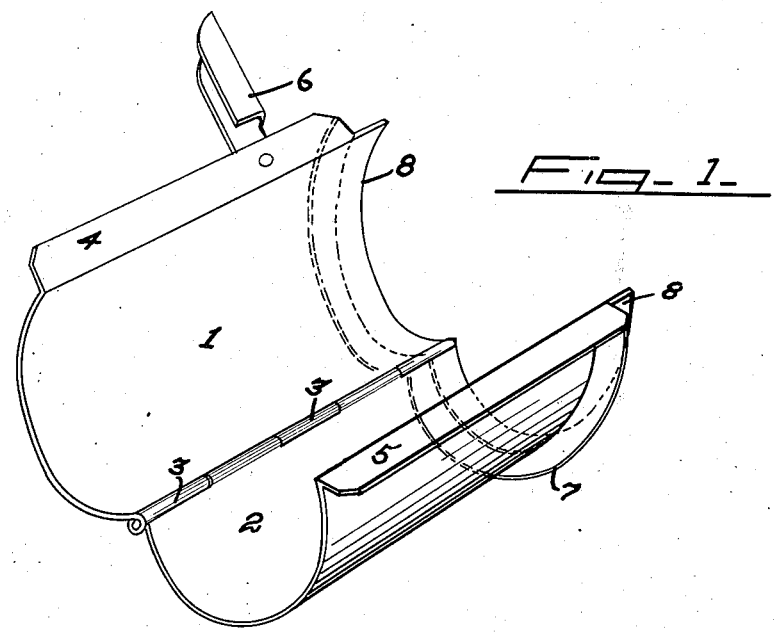
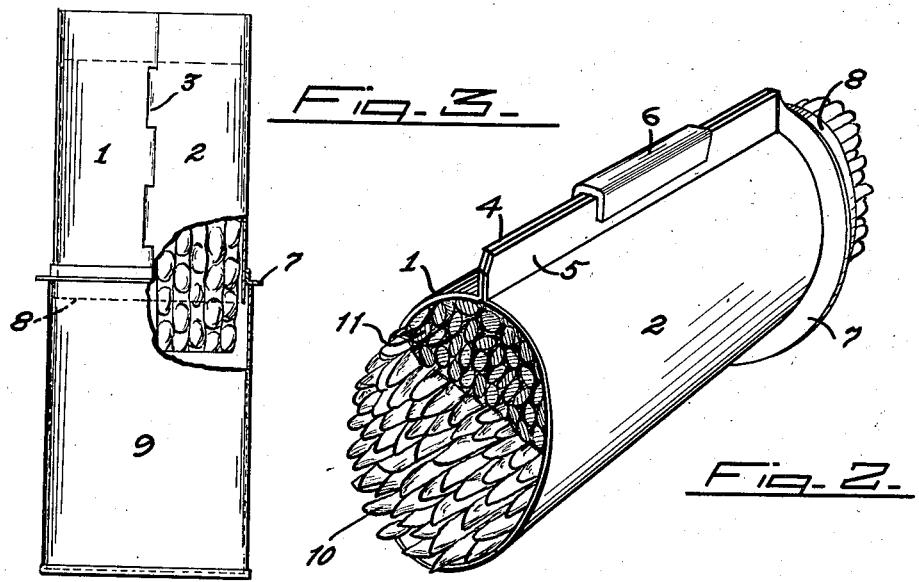
WITNESS
INVENTOR.
Anthony Greco
BY
Acker Tatum
his ATTORNEYS.

UNITED STATES PATENT OFFICE.

ANTHONY GRECO, OF SAN JOSE, CALIFORNIA.

DEVICE AND METHOD OF CANNING BEANS.

1,235,680.  Specification of Letters Patent.  Patented Aug. 7, 1917.

Application filed May 1, 1917. Serial No. 165,800.

*To all whom it may concern:*

Be it known that I, ANTHONY GRECO, a citizen of the United States, residing at San Jose, in the county of Santa Clara and State of California, have invented certain new and useful Improvements in Devices and Methods of Canning Beans, of which the following is a specification.

The hereinafter described invention relates to an improved device and method of preparing string beans for canning, the object of the invention being to expedite the handling and placing of the beans within the can, to provide for uniformity of the canned beans and at the same time to enhance the appearance of the beans within the can or container.

In carrying out my invention the string is first removed from the beans and the beans are then blanched for approximately two minutes, after which the beans which are then in a soft pliable condition, are placed in bunch formation within a suitable mold and the ends of the beans projecting beyond the mold are cut off flush therewith, so as to secure uniformity as to length thereof. The beans in bunch formation are then placed into the can by inserting the end of the mold holding the beans within the open end of the can, releasing or unclamping the mold, and then applying a slight jar to the mold to cause the beans to slip therefrom into the can. As thus applied within the can the beans are neatly and attractively placed therein and of a uniform length, with the result that when the can is opened, and the contents removed therefrom, there is presented to the eye a bunch of beans of substantially uniform length.

In carrying out the described invention, a suitable mold is employed for placing the beans in bunch formation and suitably compressing the same prior to the placing thereof within the can, such mold and the applying of the same with the beans therein to the can is disclosed in the accompanying drawings, wherein—

Figure 1 is a perspective view of the mold in an open position.

Fig. 2 is a similar view of the mold closed with the beans therein and the projecting ends thereof partly cut away.

Fig. 3 is a part broken view illustrating the mold applied to the open end of a can to receive the beans.

It is required that the mold be of a flexible character so as to lie open to receive the beans and to close thereon to place the same in compact bunch formation, the mold being of such size as to hold the requisite quantity of beans to fill the can designed to receive the same. The mold is here shown as comprising a plurality of members 1, and 2, which are united one to the other by the hinged joints 3. The free edges of the members 1 and 2 are formed with outwardly projected flanges 4 and 5 respectively, which when the mold is closed abut, and to the flange 4 is pivoted a clamp-lock 6 to engage when lowered with the flange 5 to hold the mold in lock position when closed with the beans therein, Fig. 2 of the drawings.

At one end portion of the mold is provided an outwardly projected flange 7, which when the guide end 8 of the mold is inserted within the open mouth of the can 9 rests on the end thereof, Fig. 3 of the drawings.

With the mold in an open position, Fig. 1 of the drawings, the blanched beans 10 are placed therein in layers until the desired quantity for the mold is properly positioned therein. The mold is then closed and the clamp lock 6 lowered to engage the flanges 4 and 5 and lock the mold. The projecting ends of the beans are then cut away flush with the ends of the mold, a portion of the cut-away ends being illustrated at 11—Fig. 2 of the drawings. With the beans thus clamped and the projecting ends cut away, the guide end 8 of the mold is inserted within the open mouth of the can 9 and the clamp lock 6 thrown upwardly to release or unclamp the mold. It is then only required to slightly raise the mold and with a downward movement thereof cause the flange 7 to impact onto the end of the can 9, to cause the bunch of beans to slip from within the released mold into the can.

While the invention has been described for use in connection with the canning of beans, it is obvious that the same is applicable to the canning of asparagus or any similar vegetable desired to be placed within cans in bunch formation.

Having thus described the invention what is claimed as new and desired to be protected by Letters Patent is:—

1. The method of canning beans which consists in arranging the beans in bunch formation within a mold, thence placing one end of the mold with respect to the open mouth of a can, and finally causing the beans to move from within the mold into the can in bunch formation.

2. The method of canning beans which consists in arranging the beans in bunch formation within a mold, then removing the projecting end of the beans flush with the ends of the mold, thence placing one end of the mold with respect to the open mouth of a can, and finally causing the beans to move from within the mold into the can in bunch formation.

3. The method of canning vegetables of the described class which consists in placing the same in bunch formation within an inclosing mold, thence clamping the mold, thence placing one end of the mold in relation to the open mouth of a can, thence releasing the mold and causing the contents thereof to move into the can.

4. A device for use in the canning of beans and similar vegetables in bunch formation, the same comprising a mold for the reception of the vegetable to be canned, lock means for holding the mold in locked position, and an outwardly projected flange on the mold adjacent one of its ends.

5. A device for use in the canning of beans, the same comprising a mold adapted to receive and encompass the beans in bunch formation, means for holding the mold in closed position, and an outwardly projected flange on the mold adjacent one end thereof adapted to contact with the end of a can.

6. The method of canning beans or similar elongated vegetables, the same consisting in arranging the vegetables in bunch formation within an encircling mold, closing the mold to encompass the vegetables therein, applying one end of the mold to the open end of a can, and causing the bunch of vegetables to pass endwise from within the mold into the can by the application of a slight jar or tap to the mold.

In testimony whereof I have signed my name to this specification in the presence of two subscribing witnesses.

ANTHONY GRECO.

Witnesses:
HARRY H. TOTTEN,
D. B. RICHARDS.